United States Patent [19]

Immel

[11] 4,035,216

[45] July 12, 1977

[54] METHOD FOR BONDING EXPANDED POLYMERIC PARTS

[75] Inventor: Richard H. Immel, Osborne, Pa.

[73] Assignee: ARCO Polymers, Inc., Philadelphia, Pa.

[21] Appl. No.: 676,828

[22] Filed: Apr. 14, 1976

Related U.S. Application Data

[63] Continuation-in-part of Ser. No. 258,089, May 30, 1972, abandoned, and a continuation-in-part of Ser. No. 480,974, June 19, 1974, abandoned.

[51] Int. Cl.² .................... B32B 31/26; H05B 9/04
[52] U.S. Cl. ..................... 156/273; 219/10.41; 219/10.53; 264/27; 264/DIG. 76
[58] Field of Search ........... 156/273, 79, 182, 292, 156/78; 264/27, 35, DIG. 76, DIG. 46; 219/10.41, 10.53, 10.81; 428/158, 315

[56] References Cited

U.S. PATENT DOCUMENTS

| | | | |
|---|---|---|---|
| 2,859,153 | 11/1958 | Zucht | 156/273 |
| 2,992,958 | 7/1961 | Yamaguchi | 156/273 |
| 3,060,513 | 10/1962 | Klink et al. | 156/273 |
| 3,344,222 | 9/1967 | Shapiro et al. | 156/79 |
| 3,738,886 | 6/1973 | Southgate | 156/273 |

Primary Examiner—Douglas J. Drummond
Assistant Examiner—M. G. Wityshyn
Attorney, Agent, or Firm—Hubert E. Evans

[57] ABSTRACT

A method for bonding expanded polymeric parts without an adhesive. The method comprises wetting the surfaces to be bonded with water or water containing from about 1% to 2% wetting agent, positioning the surfaces to be bonded in a nonmovable abutting relationship, encapsulating the joint formed by the abutting surfaces with a mold, and, while encapsulated, passing high frequency electrical energy therethrough to effectuate a bond.

3 Claims, No Drawings

METHOD FOR BONDING EXPANDED POLYMERIC PARTS

PRIOR APPLICATIONS

This application is a continuation-in-part of U.S. application Ser. No. 258,089, filed May 30, 1972, now abandoned, and a continuation-in-part of U.S. application Ser. No. 480,974, filed June 19, 1974, now abandoned.

FIELD OF THE INVENTION

The present invention relates to the nonadhesive bonding of expanded polymeric parts, and, in particular, to the bonding of molded expanded polystyrene parts having a closed cellular structure by the utilization of high frequency electrical energy.

BACKGROUND OF THE INVENTION

The art of making integral low density polymeric closed cellular structures from particulate expandable polymeric material is well known. Expandable polymeric materials include polystyrene, alkyl-substituted styrenes, copolymers of styrene, alphamethyl styrene, and the like. These materials can be made by forming a stable aqueous suspension of polymer particles and impregnating the suspended particles with a volatile aliphatic hydrocarbon such as petroleum ether, pentane, hexane, heptane, and the like. The expandable materials have from 3 to 30 parts by weight of the aliphatic or cycloaliphatic hydrocarbon incorporated therein. These expandable particles are generally referred to as "beads" and may take any shape such as spherical, oblong, irregular, ect.

Various means have been used for heating these beads or pre-expanded beads, to cause them to expand or further expand into an integral cellular polymeric structure or part. For example, hot water, infrared rays, and steam have been used to heat the beads in a mold and cause them to expand and conform to the shape of that mold. More recently, however, it has been found that expandable polymers such as polystyrene and the like can be heated by processes utilizing high frequency electrical energy. Generally, the molding of expandable polystyrene beads to form fused integral foam pieces or parts results in a closed cellular structure; that is, there is substantially no interconnection between the cells of the structure. This means that the water vapor transmission into or through such parts is low and the buoyancy of such parts is high.

High frequency electrical energy has also been used to bond webs of porous aliphatic polyolefin material of a thickness less than 1.5 mm. to a substrate, U.S. Pat. No. 3,738,886, and large cellular plastic parts, Soviet Plastics, July 7, 1962, pp. 29-31. In these methods, however, bonding of closed cell foam polystyrene was not achieved without the use of an adhesive.

Illustrative of processes for molding or fusing expandable polystyrene to an integral structure by the use of high frequency electrical energy are U.S. Pat. Nos. 2,998,501, 3,010,157, 3,060,513 and 3,242,238.

Low density expanded polymeric structures and material have been found suitable for use in numerous applications, including packaging, insulation, and the like.

An important new application for molded low density polymeric materials and, in particular, expandable polystyrene is in the vaporizable pattern molding processes for casting. Illustrative of these processes are U.S. Pat. Nos. 2,830,343, 3,314,116 and 3,157,942. In general, the process includes embedding in sand a vaporizable casting pattern in a flask. The pattern is typically made of expandable polystyrene or other vaporizable expandable polymeric material and having a porous refractory coating. It is embedded in a clean, dry unbonded sand which emcompasses and fills all of the cavities and recesses of the pattern. The pattern usually includes an integral runner for supplying or directing the molten casting material to the embedded pattern. The molten casting material is then poured through the runner and to the pattern. The heat of molten material vaporizes the polymeric material and the gases escape through the porous refractory coating and into the sand. A casting is thus formed taking the exact shape of the pattern. By this method, extremely complex castings can be made in a manner which provides not only a superior casting, but one which is prepared at a substantially reduced cost over conventional casting methods. In order to take advantage of these benefits, however, it is necessary to utilize a high quality expanded polymeric pattern, particularly with respect to surface quality and dimensions.

The production of low density polymeric structures or patterns generally must be carried out in a mold using conventional molding techniques. Moreover, many of the castings for which patterns are made are extremely complex such as engine blocks, manifolds, brake assemblies, and the like. Because of this complexity, expandable polymeric materials do not lend themselves to conventional molding techniques without considerable time and expense. To overcome the difficulties attendant with the complex patterns as well as conventional molding techniques and still maintain high quality, it has been proposed to divide the complex pattern into a number of component elements which are relatively simple to mold. These component elements are then bonded together to form the complex pattern.

While a high strength bond is not required, it must have strength sufficient to maintain the integrity of the pattern during normal production handling, such as placing it in the flask and withstanding vibrational forces used to settle and complete filling by the sand. Moreover, the bonding material must volatize at substantially the same temperature and at the same time. Otherwise, irregularities in or on the casting are created. Use of adhesives have the disadvantage that an adhesive line would be formed and serve as a partial block when pouring the molten casting material because of its relatively high density and resistance of vaporization causing irregularities in the casting. Also, many of the adhesives leave undesirable residues in the casting. Further, adhesives require time to set or cure. Hot wax has been utilized for bonding, but it has not been found generally satisfactory. Not only does it lack strength as a bond, but it is difficult to handle because of its very fast setting time. Accordingly, it is extremely difficult and/or expensive to prepare a complex pattern from component parts utilizing conventional bonding techniques.

The present invention provides a method for bonding foamed polystyrene parts without the use of an adhesive. The invention further provides a method which renders the surface at the joint of a quality substantially equal to the surface of the expanded part. The method of the present invention is adaptable for low cost, high production processes; thus, overcoming the disadvantages of conventional bonding techniques.

DESCRIPTION OF THE PRESENT INVENTION

The method of the present invention comprises wetting either one or more of the surfaces to be bonded and subjecting the parts while in a nested or mated relationship to high frequency, preferably radio frequency, electrical energy. To obtain high quality or uniformly continuous surfaces of the mated parts, it is preferable that after the surfaces have been wetted, that they be placed in a mold or jig which encapsulates the perimeter of the joint formed by the surfaces to be mated.

Generally, expanded or expandable polymeric materials do not possess high power loss factors which would enable them to undergo dielectric heating. By covering the expanded surfaces with water which possesses a higher power loss factor, the high frequency electrical field energy is absorbed and converted to thermal energy. The thermal energy heats the mating surfaces of the expandable polymeric structure causing them to further expand into each other to create a bond of sufficiently high strength and of a density only slightly less than the parts themselves. Preferably, therefore, the parts to be bonded are of sufficiently recent molding, for example within three months, to take advantage of any residual blowing agent remaining in the expanded cellular structure at the surface. Otherwise, the air within the closed cellular structure of the part must be used rather than residual blowing agent to further expand surfaces together.

Preferably the water used to coat the surfaces includes a wetting agent or detergent in an amount from about 1% to 2%. While the type of wetting agent useful in the present invention is practically unlimited, alkyl aryl sulfonate sold commercially as Nacconol NRSF is preferred. Also, the laundry detergent Joy has been found useful. Other suitable wetting agents include fatty acid tertiary amine salts, alkyl aryl polyether alcohols, polyglycol esters, dialkyl esters of sulfosuccinic acids, sulfonated fatty acid esters, sulfated fatty acid esters, fatty amides and polyamides, salts of sulfate esters of alkyl phenoxy, polyoxyethylene alkanols, long chain hydrocarbon sodium sulfonates, fatty alkylol amide condensates, and the like. The utilization of a wetting agent is preferred, because a more uniform coating is achieved with the use of less water which, in turn, requires the application of less high frequency energy. Aqueous solutions of alkyl aryl sulfonates, which are preferred, provide an excellent high loss power factor for converting or transferring high frequency energy to thermal energy.

As stated above, it is necessary to abut the surfaces of the parts in a nested or mated relationship so that no relative motion thereof can be achieved during the application of the high frequency energy. In making complex patterns from component parts, it is necessary to encapsulate the perimeter of the joint formed by the abutting surfaces to assure against post expansion foaming and consequential distortion of the joint line. Moreover, by method of the present invention, any surface irregularities along the joint or mating line are filled by the steam pressure generated within the joint forcing the material outwardly. Accordingly, surface continuity of the entire part is made.

The mold or jig is preferably made of a nonconductive, low loss power factor material such as epoxy, polyethylene, polypropylene, and the like. A conductive or metal mold would be subject to high voltage arcing from the high frequency electrical energy source.

The high frequency electrical field is preferably between 5 and 2000 MHz, which includes both radio frequency and microwave electrical energy and, preferably, between about 13 and 75 MHz. The power required for sufficient bonding is dependent upon the size or number of parts to be bonded, the electrode spacing, and the like. Insufficient power may vaporize the aqueous solution without creating the necessary thermal energy for bonding. For small individual parts, such as an automotive brake assembly pattern, where the electrodes are not separated by large distances, 5Kw of power has been found adequate. Large production scale bonding may require substantially larger power usage, however, for example 200–400 Kw.

To avoid vaporization of the liquid without creating the necessary thermal energy to effect bonding, the electrical intensity of the field is adjusted to be greater than about 1.16 KV/in. and preferably between 1.3 and 2.3 KV/in. Moreover, the most efficient bonding of surfaces is achieved by positioning the parts between the electrodes so that the joint is perpendicular thereto. In that manner, the electrical field is directed in a direction parallel to the joint. However, in some cases this is not practical because the size of the part would require separating the electrodes a distance which would require extraordinary high power to achieve bonding along the entire length of the parts.

The time necessary for bonding is extremely short, for example 5 to 10 seconds, older parts requiring slightly longer times. Subjecting the parts to excessive energy treatment does not cause charring or other deleterious conditions. Accordingly, the time in which the parts are subjected to high frequency energy is adjustable to meet production schedules, either batch or continuous lines.

Furthermore, the parts coated with water do not have to be subjected to the high frequency energy immediately after application. It has been found, particularly with water in which a wetting agent has been added that even after a period of time has elapsed, e.g., 10 or more minutes, that a strong bond is effected. Thus, the present method is conducive to the fabrication of parts on a large production scale.

Illustratively, expanded polystyrene parts having a closed cellular structure have been bonded by coating either one or both surfaces with water or water and a detergent alkyl aryl sulfonate (1.0%). The coated parts were then placed in a mold which held the surfaces to be bonded in abutting relationship in which no relative movement was capable and the perimeter of the joint formed by the surfaces to be bonded was encapsulated. The parts (in the mold) were placed in a model 34ALH Thermal Electronic Heat Generator (W. T. LaRose & Assoc.). High frequency electrical energy having an output of 5 Kw at 75 MHz was passed through the parts for a period of from 5 to 10 seconds. The parts were allowed to cool for about 15 seconds prior to removal from the mold to eliminate the possibility of any post expansion at the surface of the joint. The parts had a strong uniform bond with a continuous surface, i.e., no discernible joint, and were suitable as high quality casting patterns.

While the present invention has been described in particularity, it may otherwise be embodied within the scope of the appended claims.

I claim:
1. A method for bonding molded parts of expanded polystyrene or copolymers thereof having a closed cellular structure without the use of adhesive comprising:
   a. wetting at least one of the surfaces to be bonded with water containing up to about 2% of a wetting agent;
   b. placing the surfaces to be bonded in abutting relationship free from relative movement;
   c. passing high frequency electrical energy through said abutted surfaces for a time sufficient to vaporize said water and to effect a bond having substantial continuity along the joint between the abutting surfaces; and
   d. allowing the abutted surfaces to cool for sufficient time to complete the weld.

2. A method as set forth in claim 1 including the step of encapsulating the perimeter of the joint formed by the surfaces to be bonded to prevent post expansion foaming.

3. A method as set forth in claim 1 wherein said high frequency electrical energy is in a range of from 5 MHz to about 2,000 MHz.

* * * * *